US011759955B2

(12) United States Patent
Tsukamoto et al.

(10) Patent No.: US 11,759,955 B2
(45) Date of Patent: Sep. 19, 2023

(54) CALIBRATION METHOD

(71) Applicant: Seiko Epson Corporation, Toyko (JP)

(72) Inventors: Kentaro Tsukamoto, Azumino (JP); Kenji Matsuura, Matsumoto (JP)

(73) Assignee: SEIKO EPSON CORPORATION

(*) Notice: Subject to any disclaimer, the term of this patent is extended or adjusted under 35 U.S.C. 154(b) by 210 days.

(21) Appl. No.: 17/204,979

(22) Filed: Mar. 18, 2021

(65) Prior Publication Data

US 2021/0291377 A1 Sep. 23, 2021

(30) Foreign Application Priority Data

Mar. 19, 2020 (JP) ................................ 2020-048807

(51) Int. Cl.
*B25J 9/16* (2006.01)
*B25J 13/08* (2006.01)
*G01B 11/00* (2006.01)

(52) U.S. Cl.
CPC ........... *B25J 9/1692* (2013.01); *B25J 13/089* (2013.01); *G01B 11/002* (2013.01)

(58) Field of Classification Search
CPC ...... B25J 9/1692; B25J 13/089; B25J 9/1602; B25J 9/1664; B25J 9/1697; G01B 11/002; G05B 2219/39008; G05B 2219/39041; G05B 2219/39054; G05B 2219/39055
See application file for complete search history.

(56) References Cited

U.S. PATENT DOCUMENTS

| | | | | |
|---|---|---|---|---|
| 2005/0225278 | A1 | 10/2005 | Ban et al. | |
| 2009/0118864 | A1* | 5/2009 | Eldridge | B25J 9/1692 901/29 |
| 2011/0066393 | A1* | 3/2011 | Groll | B25J 9/1676 73/1.79 |
| 2016/0279800 | A1* | 9/2016 | Onda | B25J 9/1692 |
| 2018/0004188 | A1* | 1/2018 | Yamaguchi | B25J 9/16 |
| 2018/0304467 | A1 | 10/2018 | Matsuura et al. | |

FOREIGN PATENT DOCUMENTS

| | | | |
|---|---|---|---|
| JP | H08-085083 | A | 4/1996 |
| JP | 2005-300230 | A | 10/2005 |
| JP | 2013-082032 | A | 5/2013 |
| JP | 2018-176404 | A | 11/2018 |

* cited by examiner

*Primary Examiner* — Jeff A Burke
*Assistant Examiner* — Blake A Wood
(74) *Attorney, Agent, or Firm* — Harness, Dickey & Pierce, P.L.C.

(57) ABSTRACT

A calibration method, in a robot having a robot arm, of obtaining a position relationship between a first control point set for an end effector attached to a distal end of the robot arm and a second control point set on the distal end of the robot arm, includes a sixth step of calculating a second position relationship between a second reference position obtained from a position of the second control point in a third state and a position of the second control point in a fourth state and a first feature point in the fourth state, and a seventh step of calculating coordinates of the first feature point in a robot coordinate system based on a first position relationship and the second position relationship.

3 Claims, 22 Drawing Sheets

100
1
10
11
12
13
14
15
16
17
18
19
20
21
3
31
32
33
4
41
5
171
172
173
174
175
176
M1, E1
M2, E2
M3, E3
M4, E4
M5, E5
M6, E6
CP
TCP
X
Y
Z
U
V
W 100
1
4
TEACHING APPARATUS
41
PROCESSOR
42
MEMORY UNIT
43
COMMUNICATION UNIT
3
CONTROL APPARATUS
31
PROCESSOR
32
MEMORY UNIT
34
COMMUNICATION UNIT
19
FORCE DETECTION UNIT
5
IMAGING UNIT
D1 MOTOR DRIVER
E1 ENCODER
M1 MOTOR
D2 MOTOR DRIVER
E2 ENCODER
M2 MOTOR
D3 MOTOR DRIVER
E3 ENCODER
M3 MOTOR
D4 MOTOR DRIVER
E4 ENCODER
M4 MOTOR
D5 MOTOR DRIVER
E5 ENCODER
M5 MOTOR
D6 MOTOR DRIVER
E6 ENCODER
M6 MOTOR

CALIBRATION METHOD

The present application is based on, and claims priority from JP Application Serial Number 2020-048807, filed Mar. 19, 2020, the disclosure of which is hereby incorporated by reference herein in its entirety.

BACKGROUND

1. Technical Field

The present disclosure relates to a calibration method.

2. Related Art

For example, as shown in JP-A-8-85083, a robot having a robot arm with a tool as an end effector attached to a distal end thereof and performing predetermined work on a work-piece by driving the robot arm is known. In the robot, a position of a tool center point set for the tool is known in a robot coordinate system, driving of the robot arm is controlled to move the tool center point to a predetermined position, and the predetermined work is performed. For the operation, it is necessary to obtain an offset of a control point set on the distal end of the robot arm and the tool center point, that is, perform calibration.

In JP-A-8-85083, the tool center point is positioned in at least three different postures at a predetermined point on a space specified by the robot coordinate system, that is, moved to the predetermined point. Then, a position and a posture of the tool center point are obtained based on a posture of the robot arm.

However, in the method disclosed in JP-A-8-85083, the tool center point is moved to the predetermined point by visual recognition, and thus, the tool center point and the predetermined point do not necessarily actually coincide and vary. As a result, accurate calibration is difficult.

SUMMARY

A calibration method according to an aspect of the present disclosure is a calibration method, in a robot having a robot arm, of obtaining a position relationship between a first control point set for an end effector attached to a distal end of the robot arm and a second control point set closer to the robot arm side than the end effector, including a first step of imaging the robot using an imaging unit and moving the robot arm to cause a first state in which a first feature point of the robot associated with the first control point is located in a predetermined position in a captured image of the imaging unit and the robot arm takes a first posture, a second step of imaging the robot and moving the robot arm to cause a second state in which the first feature point is located in the predetermined position in the captured image of the imaging unit and the robot arm takes a second posture, a third step of calculating a first position relationship between a first reference position obtained from a position of the second control point in the first state and a position of the second control point in the second state and a position of the first feature point in the second state, a fourth step of imaging the robot using the imaging unit and moving the robot arm to cause a third state in which the first feature point is located in the predetermined position in the captured image of the imaging unit and the robot arm takes a third posture, a fifth step of imaging the robot and moving the robot arm to cause a fourth state in which the first feature point is located in the predetermined position in the captured image of the imaging unit and the robot arm takes a fourth posture, a sixth step of calculating a second position relationship between a second reference position obtained from a position of the second control point in the third state and a position of the second control point in the fourth state and the first feature point in the fourth state, and a seventh step of calculating coordinates of the first feature point in a robot coordinate system based on the first position relationship and the second position relationship.

DESCRIPTION OF EXEMPLARY EMBODIMENTS

First Embodiment

Figure 1:
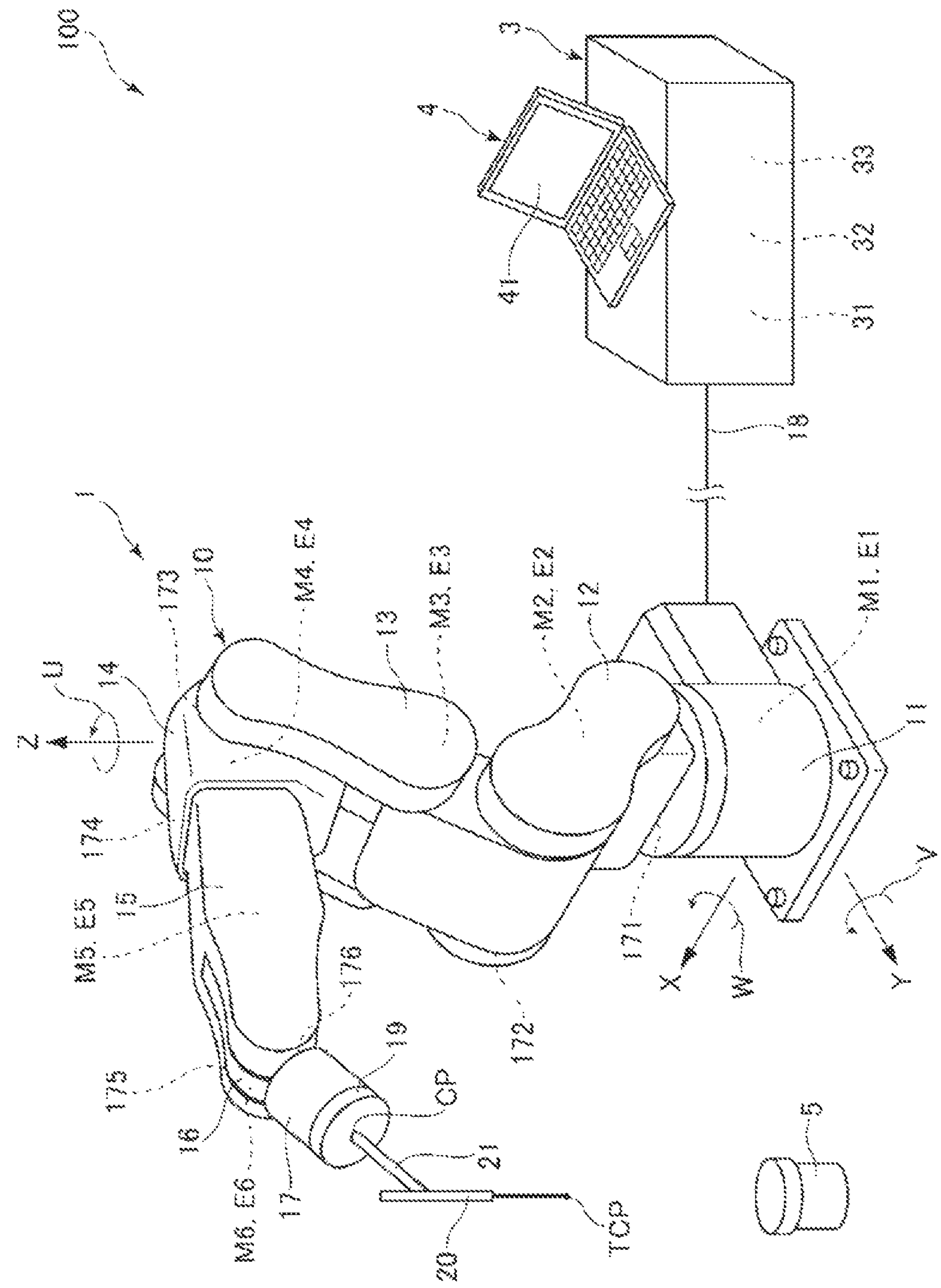
FIG. 1 shows an overall configuration of a robot system of a first embodiment.
Figure 2:
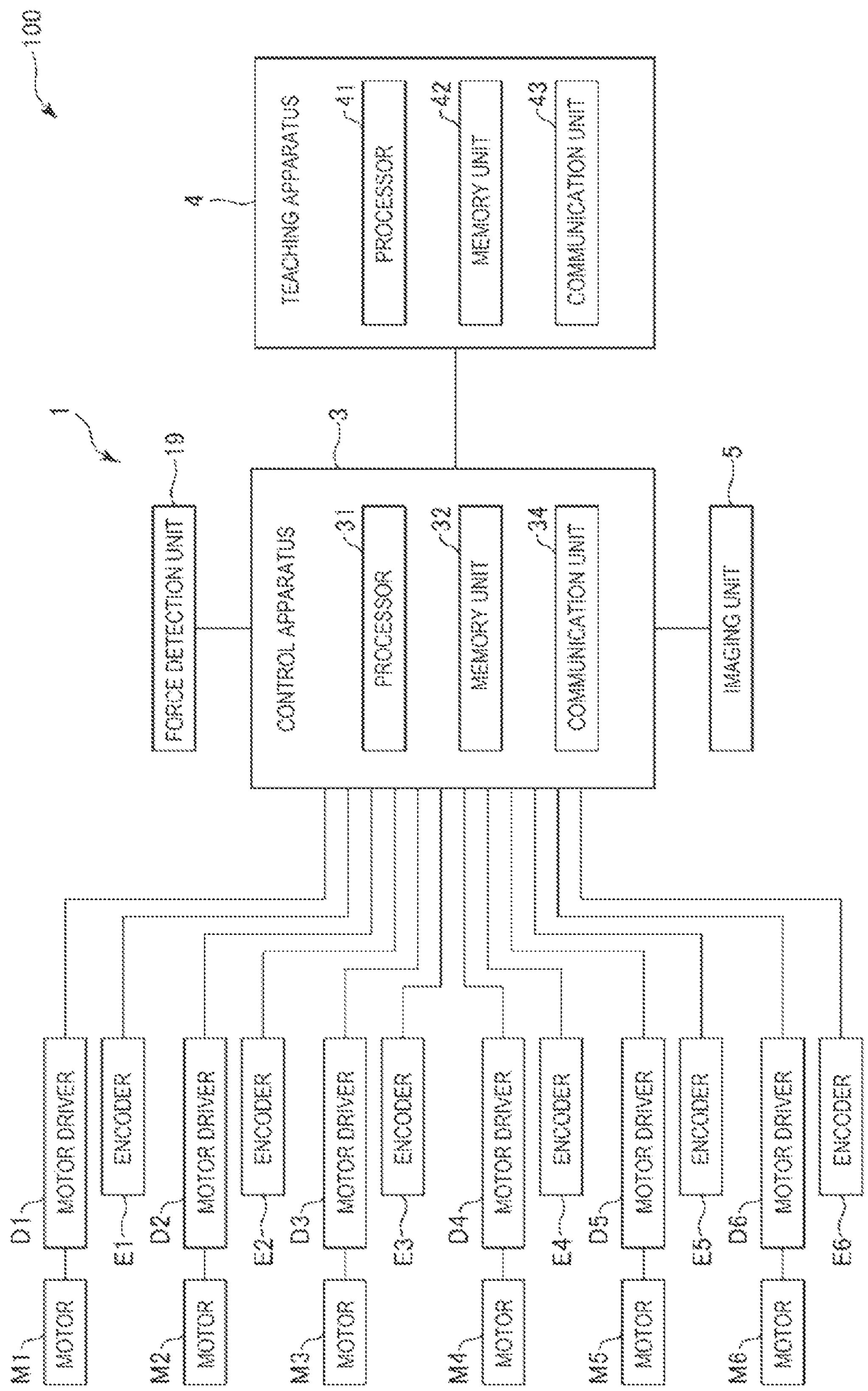
FIG. 2 is a block diagram of the robot system shown in FIG. 1.
Figure 19:
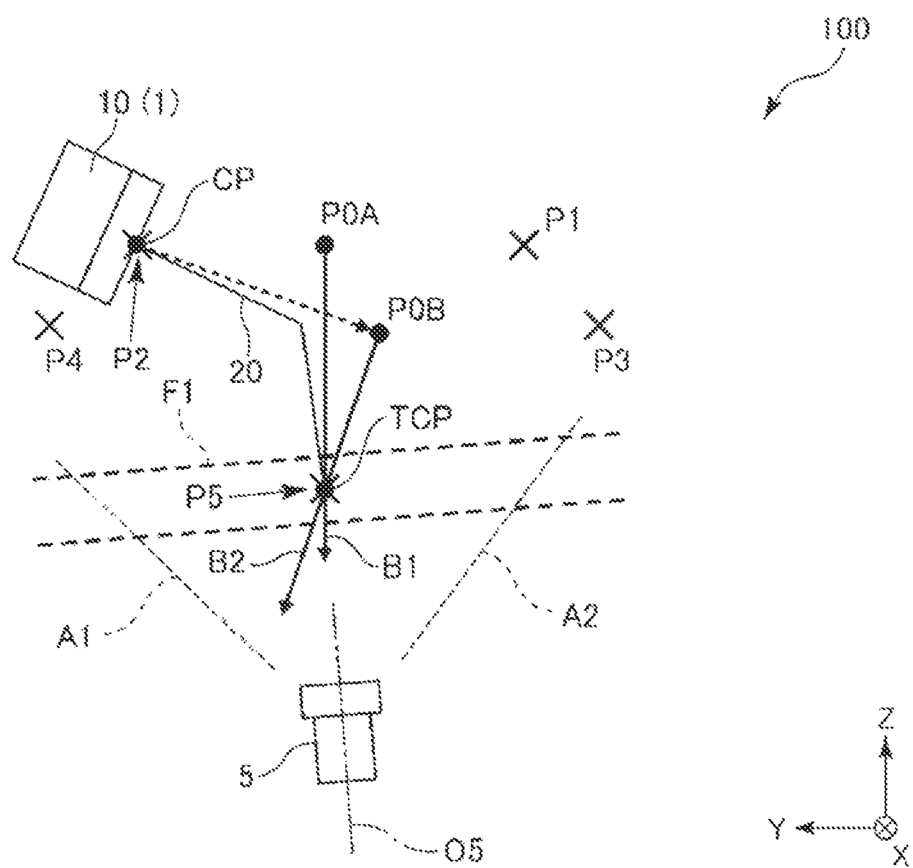
FIG. 19 is a schematic diagram showing a state in which the robot system shown in FIG. 1 executes the calibration method according to the present disclosure.
Figure 20:
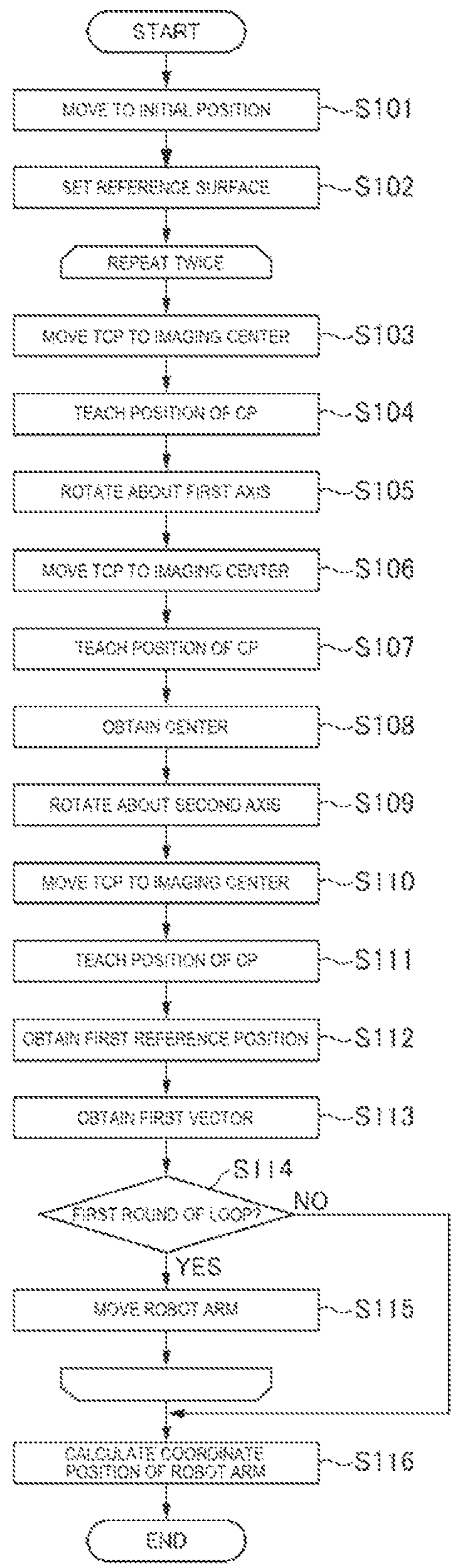
FIG. 20 is a flowchart showing an example of a movement program executed by a control apparatus shown in FIG. 1.

FIG. 1 shows an overall configuration of a robot system of a first embodiment. FIG. 2 is a block diagram of the robot system shown in FIG. 1. FIGS. 3 to 19 are schematic diagrams showing states in which the robot system shown in FIG. 1 executes a calibration method according to the present disclosure. FIG. 20 is a flowchart showing an example of a movement program executed by a control apparatus shown in FIG. 1. FIGS. 21 to 24 are perspective views showing examples of an end effector shown in FIG. 1.

As below, a calibration method according to the present disclosure will be explained in detail according to preferred embodiments shown in the accompanying drawings. Note that, hereinafter, for convenience of explanation, a +Z-axis direction, i.e., an upside in FIG. 1 is also referred to as "upper" and a −Z-axis direction, i.e., a downside is also referred to as "lower". Further, regarding a robot arm, an end portion at a base 11 side in FIG. 1 is also referred to as "proximal end" and an end portion at an opposite side, i.e., an end effector 20 side is also referred to as "distal end". Regarding the end effector and a force detection unit, an end portion at a robot arm 10 side is also referred to as "proximal end" and an end portion at an opposite side is also referred to as "distal end". Furthermore, the Z-axis directions, i.e., upward and downward directions in FIG. 1 are referred to as "vertical directions" and X-axis directions and Y-axis directions, i.e., leftward and rightward directions are referred to as "horizontal directions".

As shown in FIGS. 1 and 2, a robot system 100 includes a robot 1, a control apparatus 3 that controls the robot 1, a teaching apparatus 4, and an imaging unit 5, and executes the calibration method according to the present disclosure.

First, the robot 1 is explained.

The robot 1 shown in FIG. 1 is a single-arm six-axis vertical articulated robot in the embodiment, and has the base 11 and the robot arm 10. Further, the end effector 20 may be attached to the distal end portion of the robot arm 10. The end effector 20 may be a component element of the robot 1 or not a component element of the robot 1.

Note that the robot 1 is not limited to the illustrated configuration, but may be e.g. a dual-arm articulated robot. Or, the robot 1 may be a horizontal articulated robot.

The base 11 is a supporter that drivably supports the robot arm 10 from the downside and fixed to e.g. a floor of a factory. In the robot 1, the base 11 is electrically coupled to the control apparatus 3 via a relay cable 18. Note that the coupling between the robot 1 and the control apparatus 3 is not limited to the wired coupling like the configuration shown in FIG. 1, but may be e.g. wireless coupling or coupling via a network such as the Internet.

In the embodiment, the robot arm 10 has a first arm 12, a second arm 13, a third arm 14, a fourth arm 15, a fifth arm 16, and a sixth arm 17, and these arms are sequentially coupled from the base 11 side. Note that the number of the arms of the robot arm 10 is not limited to six, but may be e.g. one, two, three, four, five, seven, or more. The sizes including entire lengths of the respective arms are respectively not particularly limited, but can be appropriately set.

The base 11 and the first arm 12 are coupled via a joint 171. Further, the first arm 12 is pivotable about a first pivot axis parallel to the vertical direction as a pivot center relative to the base 11. The first pivot axis is aligned with a normal of the floor to which the base 11 is fixed.

The first arm 12 and the second arm 13 are coupled via a joint 172. Further, the second arm 13 is pivotable about a second pivot axis parallel to the horizontal direction as a pivot center relative to the first arm 12. The second pivot axis is parallel to an axis orthogonal to the first pivot axis.

The second arm 13 and the third arm 14 are coupled via a joint 173. Further, the third arm 14 is pivotable about a third pivot axis parallel to the horizontal direction as a pivot center relative to the second arm 13. The third pivot axis is parallel to the second pivot axis.

The third arm 14 and the fourth arm 15 are coupled via a joint 174. Further, the fourth arm 15 is pivotable about a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable about a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable about a sixth pivot axis as a pivot center relative to the fifth arm 16. The sixth pivot axis is orthogonal to the fifth pivot axis.

Furthermore, the sixth arm 17 is a robot distal end portion located at the most distal end side of the robot arm 10. The sixth arm 17 may pivot together with the end effector 20 by driving of the robot arm 10.

The robot 1 includes a motor M1, a motor M2, a motor M3, a motor M4, a motor M5, and a motor M6 as drivers and an encoder E1, an encoder E2, an encoder E3, an encoder E4, an encoder E5, and an encoder E6. The motor M1 is provided inside of the joint 171 and relatively rotates the base 11 and the first arm 12. The motor M2 is provided inside of the joint 172 and relatively rotates the first arm 12 and the second arm 13. The motor M3 is provided inside of the joint 173 and relatively rotates the second arm 13 and the third arm 14. The motor M4 is provided inside of the joint 174 and relatively rotates the third arm 14 and the fourth arm 15. The motor M5 is provided inside of the joint 175 and relatively rotates the fourth arm 15 and the fifth arm 16. The motor M6 is provided inside of the joint 176 and relatively rotates the fifth arm 16 and the sixth arm 17.

Further, the encoder E1 is provided inside of the joint 171 and detects the position of the motor M1. The encoder E2 is provided inside of the joint 172 and detects the position of the motor M2. The encoder E3 is provided inside of the joint 173 and detects the position of the motor M3. The encoder E4 is provided inside of the joint 174 and detects the position of the motor M4. The encoder E5 is provided inside of the joint 175 and detects the position of the motor M5. The encoder E6 is provided inside of the joint 176 and detects the position of the motor M6.

The encoders E1 to E6 are electrically coupled to the control apparatus 3 and position information, i.e., amounts of rotation of the motor M1 to motor M6 are transmitted to the control apparatus 3 as electrical signals. Then, the control apparatus 3 drives the motor M1 to motor M6 via motor driver D1 to motor driver D6 (not shown) based on the information. That is, controlling the robot arm 10 refers to controlling the motor M1 to motor M6.

A control point CP is set on the distal end of a force detection unit 19 provided in the robot arm 10. The control point CP refers to a point as a reference for control of the robot arm 10. In the robot system 100, the position of the control point CP is known in a robot coordinate system and the robot arm 10 is driven to move the control point CP to a desired position. That is, the control point CP is set closer to the robot arm 10 side than the end effector 20. Note that, in the embodiment, the control point CP is set on the distal end of the force detection unit 19, however, may be set in any position closer to the robot arm 10 side than the end effector 20 when the position and the posture from the origin of the robot coordinate system are known. For example, the control point may be set on the distal end of the robot arm 10.

Further, in the robot 1, the force detection unit 19 that detects a force is detachably placed in the robot arm 10. The robot arm 10 may be driven with the force detection unit 19 placed therein. The force detection unit 19 is a six-axis force sensor in the embodiment. The force detection unit 19 detects magnitude of forces on three detection axes orthogonal to one another and magnitude of torque about the three detection axes. That is, the unit detects force components in the respective axial directions of the X-axis, the Y-axis, Z-axis orthogonal to one another, a force component in a W direction about the X-axis, a force component in a V direction about the Y-axis, and a force component in a U direction about about the Z-axis. Note that, in the embodiment, the Z-axis direction is the vertical direction. The force components in the respective axial directions may be referred to as "translational force components" and the components about the respective axes may be referred to as "torque components". The force detection unit 19 is not particularly limited to the six-axis force sensor, but may have another configuration.

In the embodiment, the force detection unit 19 is placed in the sixth arm 17. Note that the placement position of the force detection unit 19 is not particularly limited to the sixth arm 17, i.e., the arm located at the most distal end side, but may be in the other arm or between the adjacent arms, for example.

The end effector 20 may be detachably attached to the force detection unit 19. The end effector 20 is a driver that fastens screws for a work object in the embodiment. Further, the end effector 20 is fixed to the force detection unit 19 via a coupling rod 21. In the illustrated configuration, the end effector 20 is set so that the longitudinal direction thereof may be in a direction crossing the longitudinal direction of the coupling rod 21.

The end effector 20 is not limited to the illustrated configuration, but may be e.g. a tool such as a wrench, a polisher, a grinder, a cutter, a driver, or the like, or a hand that grips a work object by suction or nipping.

In the robot coordinate system, a tool center point TCP as a first control point is set on the distal end of the end effector 20. In the robot system 100, the position of the tool center point TCP is known in the robot coordinate system and the tool center point TCP may be set as a reference for control. In the robot system 100, it is assumed that the position of the control point CP as a second control point set in the robot arm 10 is known in the robot coordinate system. Accordingly, a position relationship between the tool center point TCP and the control point CP is known, and thereby, the robot arm 10 may be driven using the tool center point TCP as the reference for control to perform work. Knowing the position relationship between the tool center point TCP and the control point CP is referred to as calibration. A calibration method according to the present disclosure, which will be described later, is a method for knowing the position relationship between the tool center point TCP and the control point CP.

Next, the imaging unit 5 is explained.

The imaging unit 5 may have e.g. an imaging device including a CCD (Charge Coupled Device) image sensor having a plurality of pixels, and an optical system including a lens. As shown in FIG. 2, the imaging unit 5 is electrically coupled to the control apparatus 3. Further, the imaging unit 5 converts light received by the imaging device into an electrical signal and outputs the electrical signal to the control apparatus 3. That is, the imaging unit 5 transmits an imaging result to the control apparatus 3. Note that the imaging result may be a still image or a moving image.

The imaging unit 5 is placed near the installation surface of the robot 1 and faces upward, and images above. In the embodiment, to facilitate explanation of the calibration method to be described later, the imaging unit 5 is placed so that an optical axis O5 may be slightly inclined relative to the vertical direction, i.e., the Z-axis. Note that the direction in which the imaging unit 5 faces is not particularly limited. For example, the unit may be placed to face in the horizontal direction or a direction crossing the vertical direction and the horizontal direction. The placement position is not limited to the illustrated configuration.

Next, the control apparatus 3 and the teaching apparatus 4 will be explained. In the embodiment, a case where the control apparatus 3 executes the calibration method according to the present disclosure, however, the present disclosure is not limited to that. For example, the calibration method may be performed by the teaching apparatus 4 or may be shared by the control apparatus 3 and the teaching apparatus 4.

As shown in FIGS. 1 and 2, the control apparatus 3 is placed in a position apart from the robot 1 in the embodiment. Note that the apparatus is not limited to the configuration, but may be provided inside of the base 11. The control apparatus 3 has a function of controlling driving of the robot 1 and is electrically coupled to the above described respective parts of the robot 1. The control apparatus 3 has a processor 31, a memory unit 32, and a communication unit 33. These respective units are communicably connected to one another via e.g. a bus.

The processor 31 includes e.g. a CPU (Central Processing Unit) and reads and executes various programs etc. stored in the memory unit 32. A command signal generated in the processor 31 is transmitted to the robot 1 via the communication unit 33. Thereby, the robot arm 10 may execute predetermined work. Further, in the embodiment, the processor 31 executes step S101 to step S116, which will be described later, based on the imaging result of the imaging unit 5. Note that, not limited to that, but a processor 41 of the teaching apparatus 4 may execute step S101 to step S116 or the processor 31 and the processor 41 may share step S101 to step S116.

The memory unit 32 stores various programs etc. that can be executed by the processor 31. The memory unit 32 includes e.g. a volatile memory such as a RAM (Random Access Memory), a nonvolatile memory such as a ROM (Read Only Memory), and a detachable external memory device.

The communication unit 33 transmits and receives signals between the respective parts of the robot 1 and the teaching apparatus 4 and itself using e.g. an external interface such as a wired LAN (Local Area Network) or a wireless LAN.

Next, the teaching apparatus 4 is explained.

As shown in FIGS. 1 and 2, the teaching apparatus 4 has a function of creating and inputting a movement program for the robot arm 10. The teaching apparatus 4 has the processor 41, a memory unit 42, and a communication unit 43. The teaching apparatus 4 is not particularly limited to, but includes e.g. a tablet, a personal computer, a smartphone, and a teaching pendant.

The processor 41 includes e.g. a CPU (Central Processing Unit) and reads and executes various programs such as a teaching program stored in the memory unit 42. Note that the teaching program may be generated in the teaching apparatus 4, stored from e.g. an external recording medium such as a CD-ROM, or stored via a network or the like.

A signal generated in the processor 41 is transmitted to the control apparatus 3 of the robot 1 via the communication unit 43. Thereby, the robot arm 10 may execute predetermined work in a predetermined condition.

The memory unit 42 stores various programs etc. that can be executed by the processor 41. The memory unit 32 includes e.g. a volatile memory such as a RAM (Random Access Memory), a nonvolatile memory such as a ROM (Read Only Memory), and a detachable external memory device.

The communication unit 43 transmits and receives signals between the control apparatus 3 and itself using e.g. an external interface such as a wired LAN (Local Area Network) or a wireless LAN.

As above, the robot system 100 is explained.

In the robot system 100, before the robot 1 performs predetermined work, an operator attaches an end effector according to the work to the distal end of the robot arm 10. It is necessary for the control apparatus 3 or the teaching apparatus 4 to know the attached end effector. Even when the shape and the type of the attached end effector are known, the operator does not necessarily attach the end effector in a desired posture. Accordingly, calibration to relate the positions between the tool center point TCP of the attached end effector 20 and the control point CP is performed.

As below, the calibration method according to the present disclosure will be explained according to FIGS. 3 to 19 and the flowchart shown in FIG. 20. Note that the field of imaging, i.e., the imaging range of the imaging unit 5 is a region inside of a broken line A1 and a broken line A2 shown in FIGS. 3 to 19.

Further, as below, in a captured image of the imaging unit 5, the tool center point TCP will be explained as a first feature point. That is, the tool center point TCP as the first control point is recognized as the first feature point. Note that a first step includes step S101 to step S104, a second step includes step S105 to step S111, a third step includes step S112 and step S113, a fourth step includes step S115 and step S103 and step S104 of a second round of the loop, a fifth step includes step S105 to step S111 of the second round of the loop, a sixth step includes step S112 and step S113 of the second round of the loop, and a seventh step includes step S116.

1. Step S101 (First Step)

Figure 3:
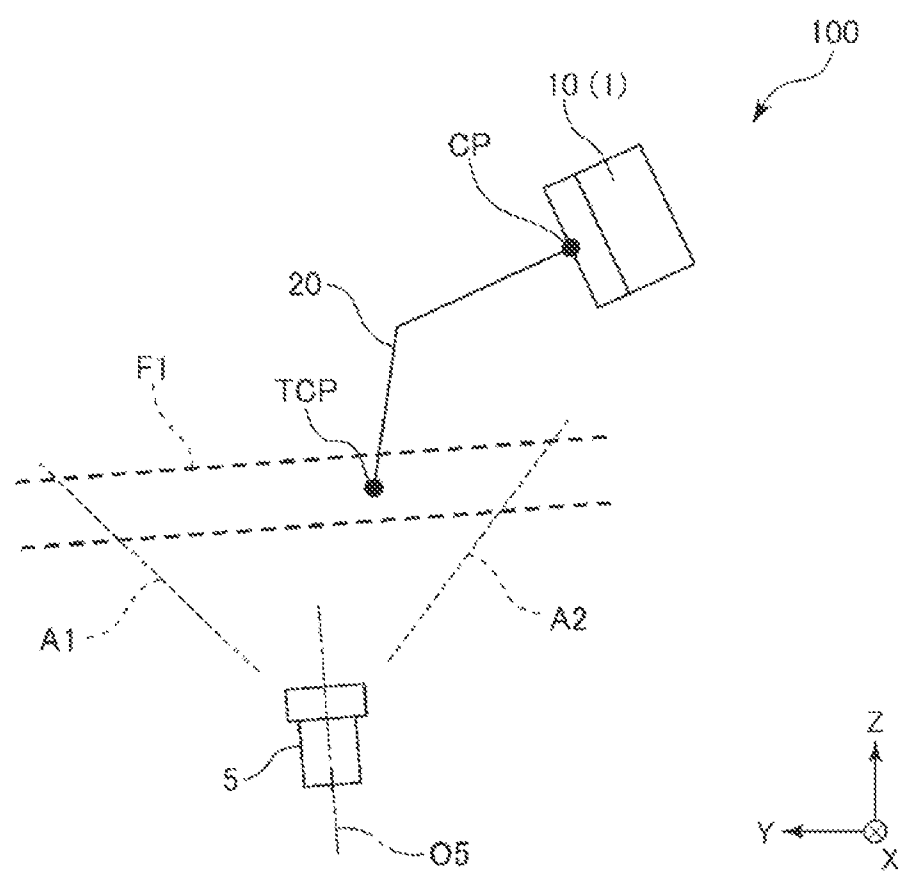
FIG. 3 is a schematic diagram showing a state in which the robot system shown in FIG. 1 executes a calibration method according to the present disclosure.

First, at step S101, as shown in FIG. 3, the robot arm 10 is moved to incline the end effector 20 relative to the Z-axis and locate the tool center point TCP in an initial position. The initial position is an arbitrary position on an imaging surface F1 as an imaging position, i.e., a focal position of the imaging unit 5. Note that the imaging surface F1 is a surface having a normal along the optical axis O5 of the imaging unit 5 and inclined relative to the X-Y plane in the embodiment.

The imaging surface F1 is the surface having the normal along the optical axis of the imaging unit 5. Further, a position in which an image can be focused has a predetermined width along the optical axis direction of the imaging unit 5. The width is of the region between the two broken lines in the drawings. Hereinafter, "located on the imaging surface F1" refers to "located in an arbitrary position within the region".

At step S101, the imaging unit 5 images the moving tool center point TCP as a picture and transmits the picture to the control apparatus 3. Then, the processor 31 captures the tool center point TCP as the first feature point in the picture transmitted from the imaging unit 5, and drives the robot arm 10 to locate the tool center point TCP in an arbitrary position on the imaging surface F1.

2. Step S102 (First Step)

Figure 4:
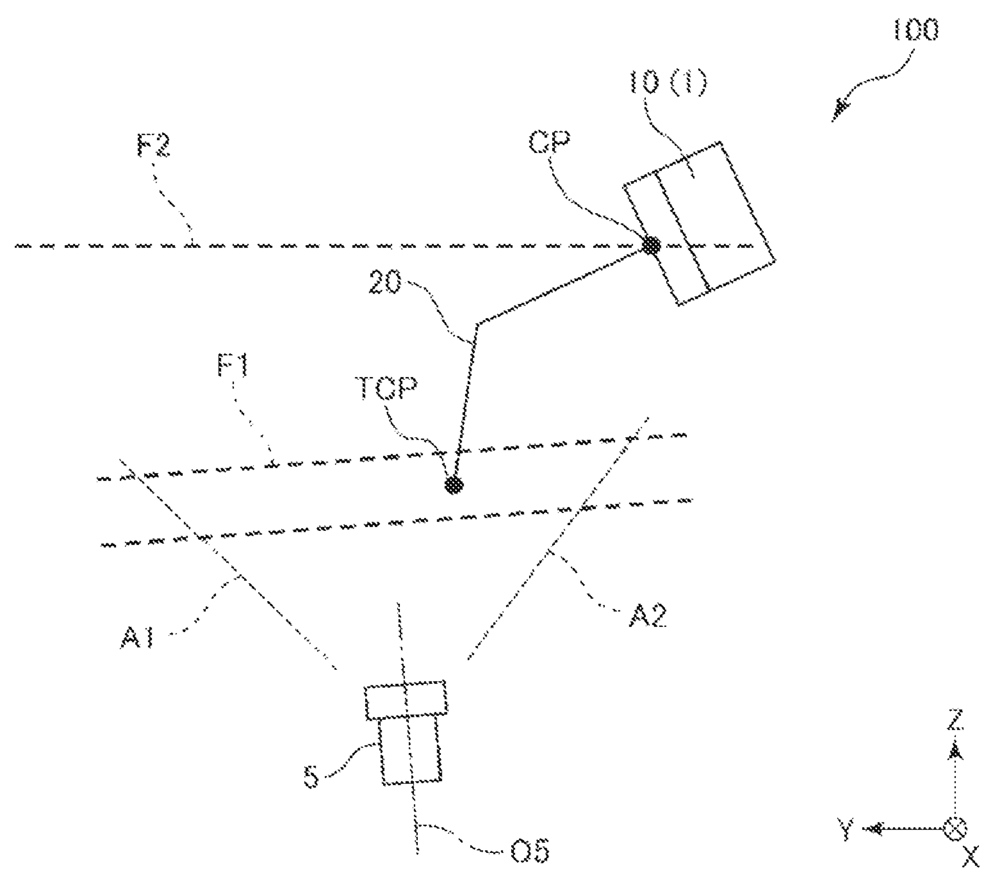
FIG. 4 is a schematic diagram showing a state in which the robot system shown in FIG. 1 executes the calibration method according to the present disclosure.

Then, at step S102, as shown in FIG. 4, a reference surface F2 is set. The reference surface F2 is a surface located closer to the +Z-axis side than the imaging surface F1 and parallel to the X-Y plane. Setting the reference surface F2 refers to setting a height, i.e., a coordinate in the Z-axis direction of the reference surface F2 and storing the height in the memory unit 32. In the embodiment, the reference surface F2 is set in the position of the control point CP when step S101 is completed.

Note that, in the embodiment, the reference surface F2 is the surface parallel to the X-Y plane, however, the present disclosure is not limited to that. The reference surface is not necessarily the surface parallel to the X-Y plane, but may be e.g. a surface parallel to the X-Z plane, a surface parallel to the Y-Z plane, or a surface inclined relative to the planes.

The reference surface F2 is a surface parallel to a working surface on which the robot arm 10 performs work and a reference when the robot arm 10 performs work. Further, at step S103, step S105, step S106, and step S109, which will be described later, the reference surface is a reference when the posture of the robot arm 10 is changed. As described above, at the first step, the reference surface F2 as the reference when the robot arm is moved is set. Thereby, step S103, step S105, step S106, and step S109 to be described later may be accurately and easily executed.

3. Step S103 (First Step)

Then, step S103 is executed. Note that step S103 to step S113 are repeated twice in different postures of the robot arm 10. First, a first round of the loop is explained.

Figure 5:
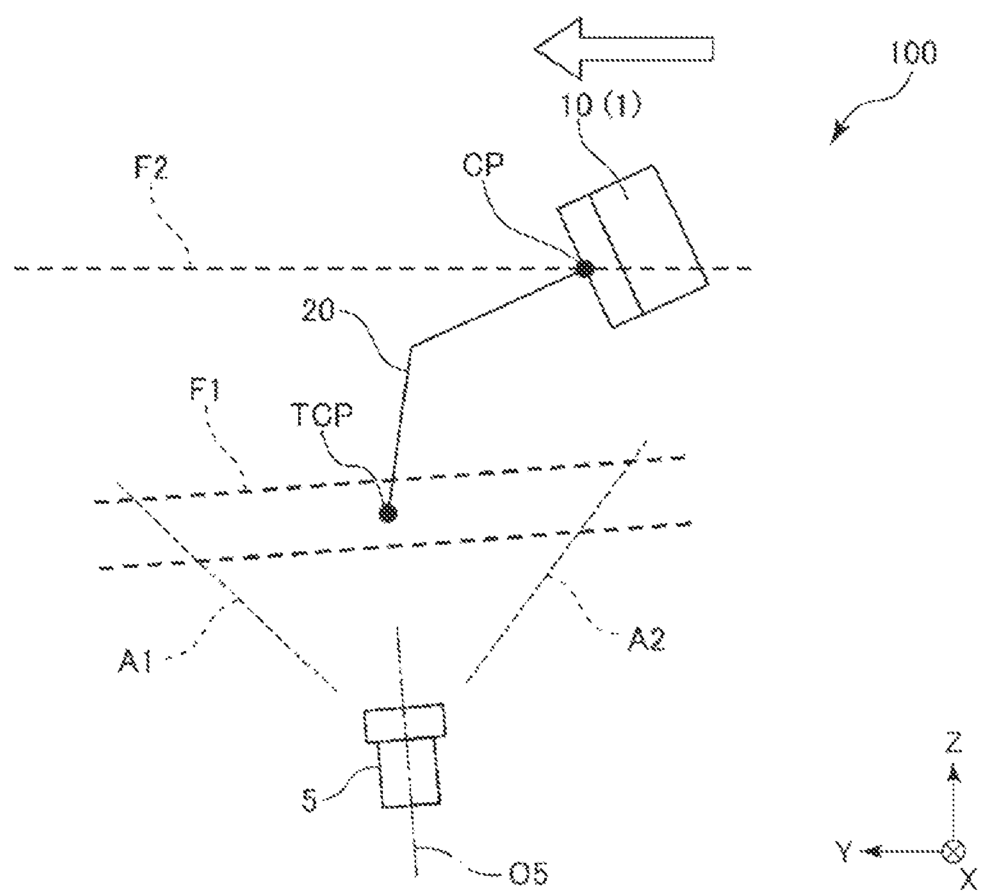
FIG. 5 is a schematic diagram showing a state in which the robot system shown in FIG. 1 executes the calibration method according to the present disclosure.

At step S103, as shown in FIG. 5, imaging is performed using the imaging unit 5 and the robot arm 10 is driven to move the tool center point TCP to an imaging center while imaging in the embodiment. In this regard, the robot arm 10 is driven to horizontally move the control point CP within the reference surface F2. Note that the imaging center is an intersection between the imaging surface F1 and the optical axis O5 of the imaging unit 5. As this step and the subsequent steps, imaging may be constantly performed or intermittently, that is, at predetermined time intervals by the imaging unit 5.

4. Step S104 (First Step)

Figure 6:
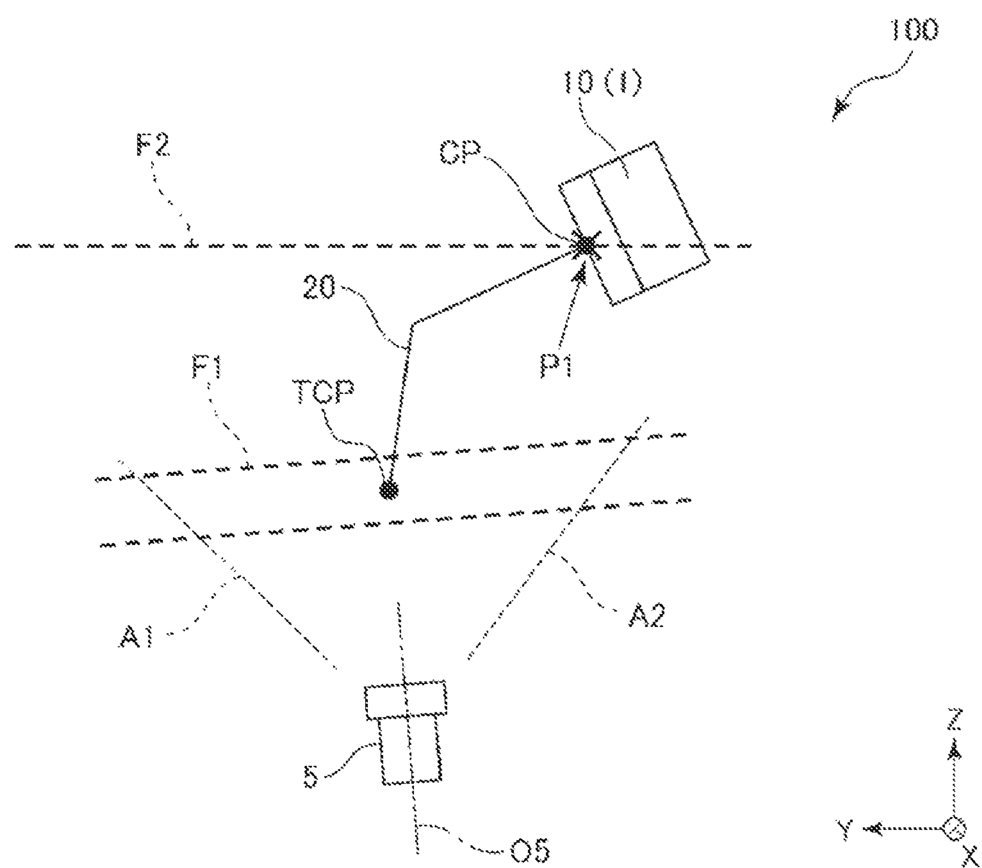
FIG. 6 is a schematic diagram showing a state in which the robot system shown in FIG. 1 executes the calibration method according to the present disclosure.

Then, at step S104, as shown in FIG. 6, the position, i.e., an X-coordinate, a Y-coordinate, and a Z-coordinate in the robot coordinate system of the control point CP when the tool center point TCP is located at the imaging center are taught. Note that teaching refers to storing in the memory unit 32. Further, a position taught at this step is referred to as "position P1".

The posture of the robot arm 10 shown in FIG. 6 is a first posture. A state in which the tool center point TCP is located at the imaging center and the robot arm 10 takes the first posture is a first state. The first step includes the above described step S101 to step S104.

5. Step S105 (Second Step)

Figure 7:
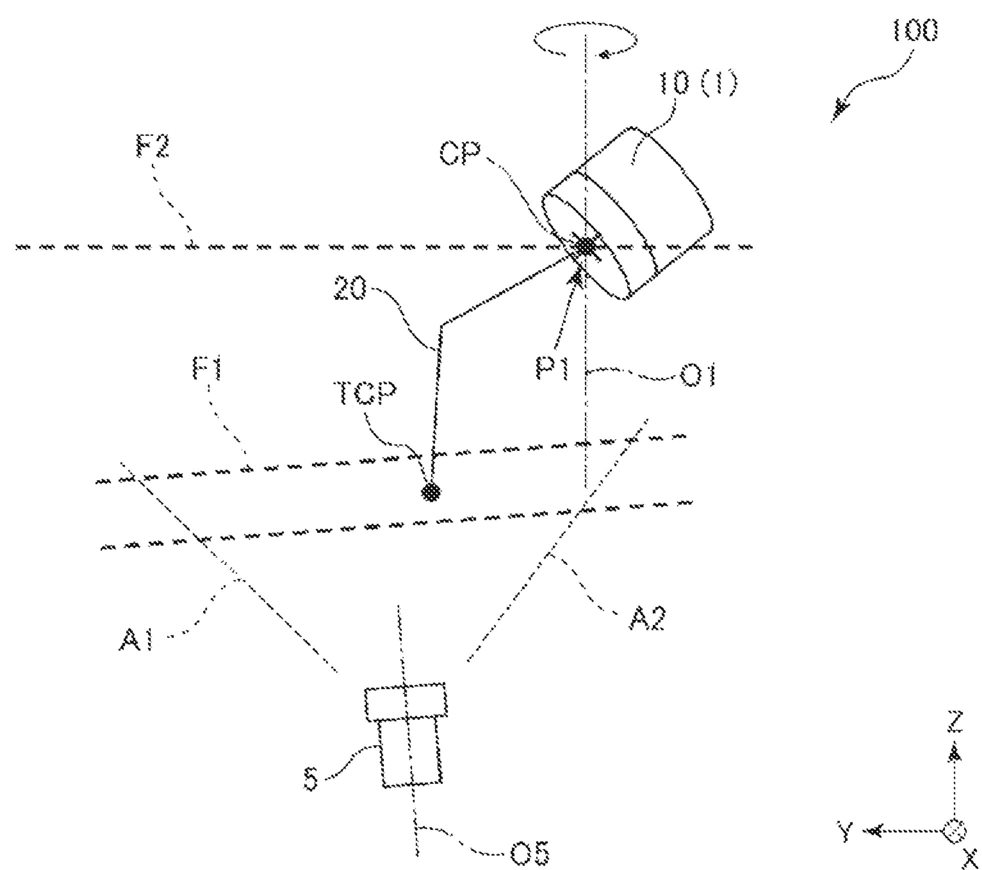
FIG. 7 is a schematic diagram showing a state in which the robot system shown in FIG. 1 executes the calibration method according to the present disclosure.

Then, at step S105, as shown in FIG. 7, the robot arm 10 is rotated about a first axis O1. The first axis O1 is a straight line passing through the control point CP in the first posture and having a normal along the reference surface F2. Further, an amount of rotation at step S105 is at such a degree that the tool center point TCP may not be located outside of the imaging range of the imaging unit 5 e.g. from 1° to 60°.

6. Step S106 (Second Step)

Figure 8:
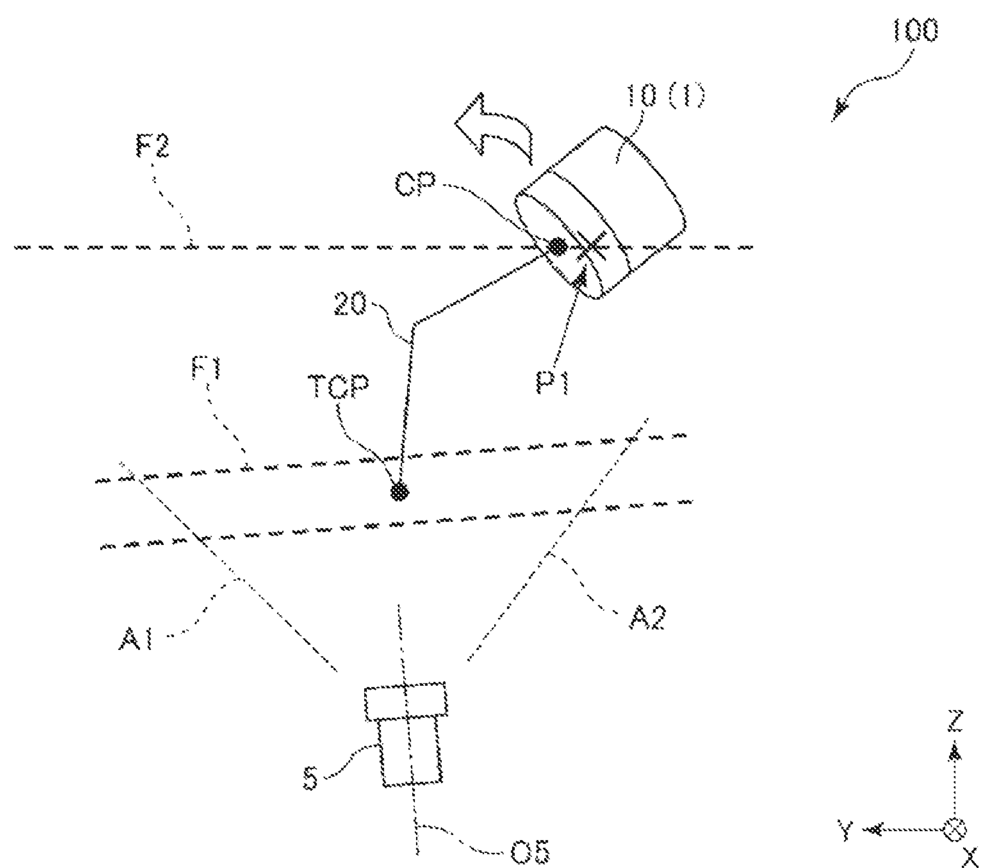
FIG. 8 is a schematic diagram showing a state in which the robot system shown in FIG. 1 executes the calibration method according to the present disclosure.

Then, at step S106, as shown in FIG. 8, the robot arm 10 is rotated about the normal of the reference surface F2 in an arbitrary position to locate the tool center point TCP at the imaging center in the captured image of the imaging unit 5 and on the imaging surface F1.

7. Step S107 (Second Step)

Figure 9:
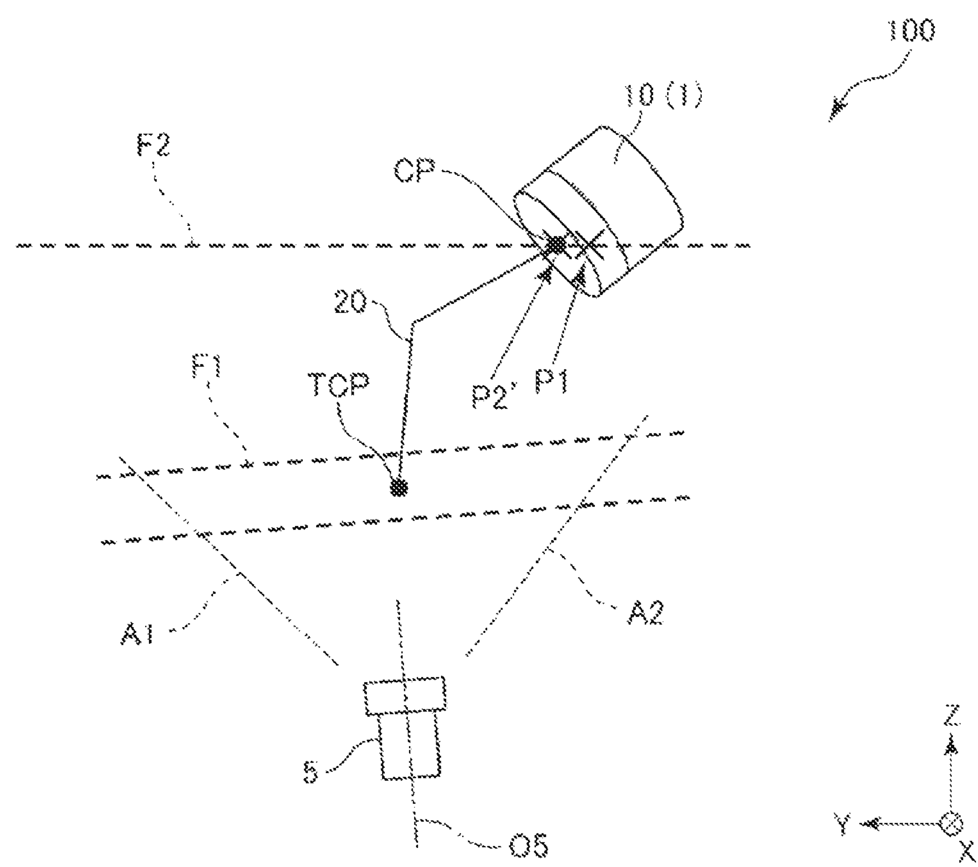
FIG. 9 is a schematic diagram showing a state in which the robot system shown in FIG. 1 executes the calibration method according to the present disclosure.

Then, at step S107, as shown in FIG. 9, a position P2' of the control point CP in a state in which the position when the movement at step S106 is completed, i.e., the tool center point TCP is located at the imaging center in the captured image of the imaging unit 5 and on the imaging surface F1 is taught.

8. Step S108 (Second Step)

Figure 10:
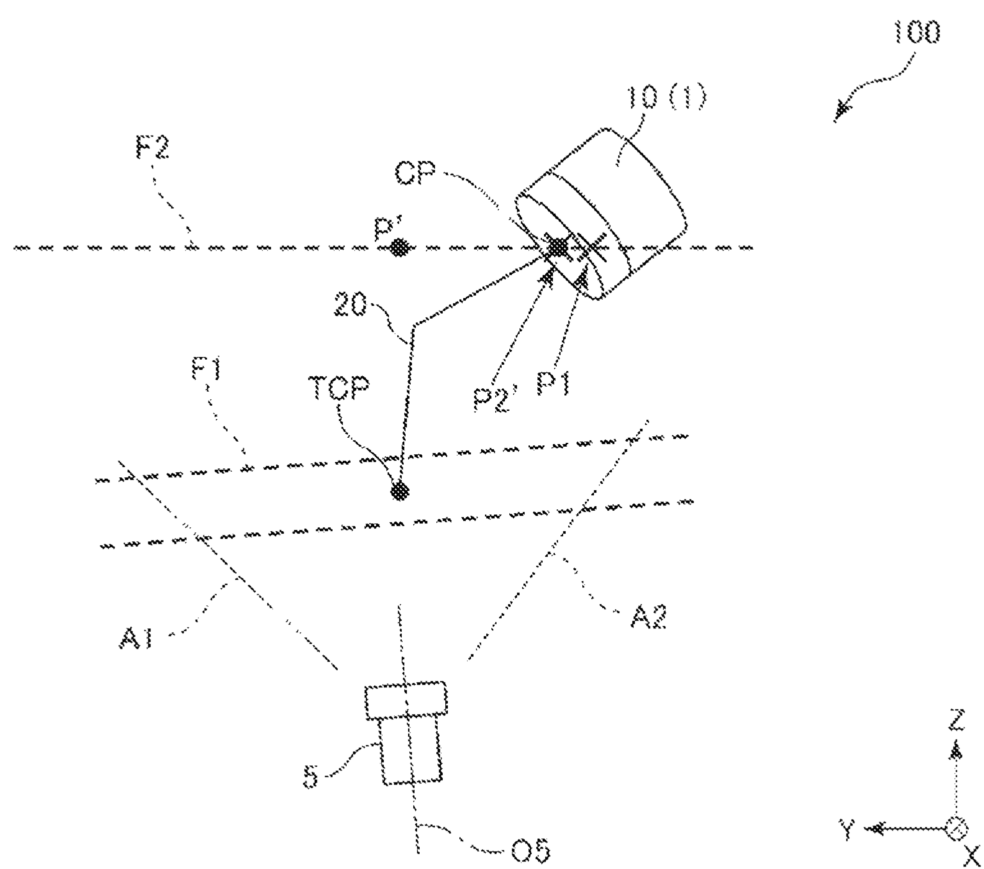
FIG. 10 is a schematic diagram showing a state in which the robot system shown in FIG. 1 executes the calibration method according to the present disclosure.

Then, at step S108, as shown in FIG. 10, a center P' is obtained based on the position P1 and the position P2'. The center P' is a center of a circle passing through the position of the tool center point TCP when the control point CP is located in the position P1 and the position of the tool center point TCP when the control point CP is located in the position P2'.

9. Step S109 (Second Step)

Figure 11:
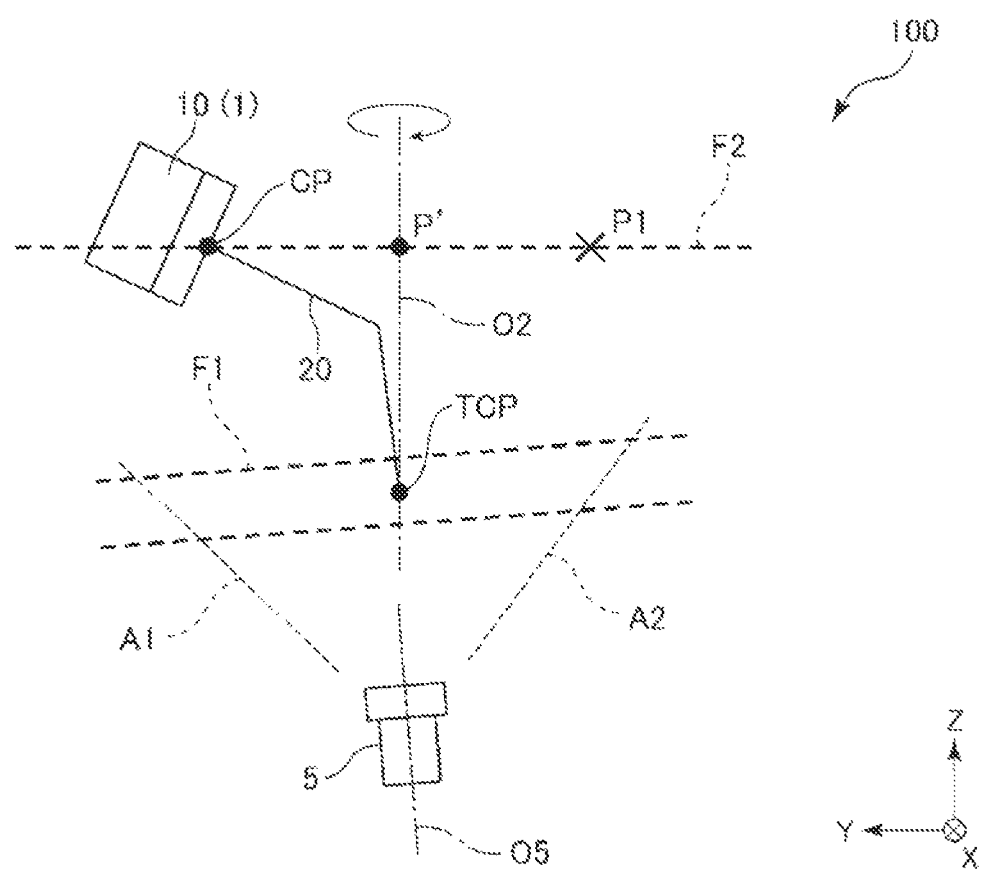
FIG. 11 is a schematic diagram showing a state in which the robot system shown in FIG. 1 executes the calibration method according to the present disclosure.

Then, at step S109, as shown in FIG. 11, the robot arm 10 is rotated about the second axis O2 passing through the center P' and parallel to the normal of the reference surface F2. It is preferable that an amount of rotation at step S109 is larger than the amount of rotation at step S105, e.g. from 30° to 180°.

10. Step S110 (Second Step)

Figure 12:
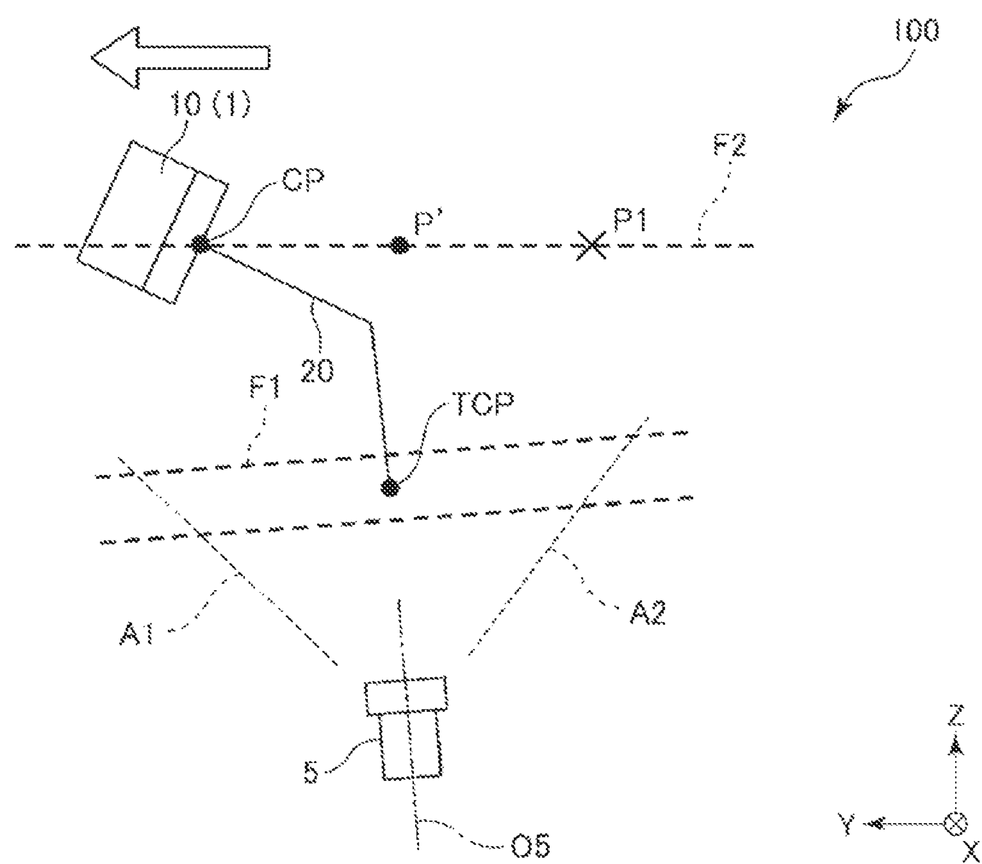
FIG. 12 is a schematic diagram showing a state in which the robot system shown in FIG. 1 executes the calibration method according to the present disclosure.

Then, at step S110, as shown in FIG. 12, the robot arm 10 is driven to locate the tool center point TCP at the imaging center in the captured image of the imaging unit 5 and on the imaging surface F1. Thereby, the robot arm 10 turns into a second state. The second state refers to a state in which the tool center point TCP is located at the imaging center in the captured image of the imaging unit 5 and the robot arm 10 takes a second posture different from the first posture.

11. Step S111 (Second Step)

Figure 13:
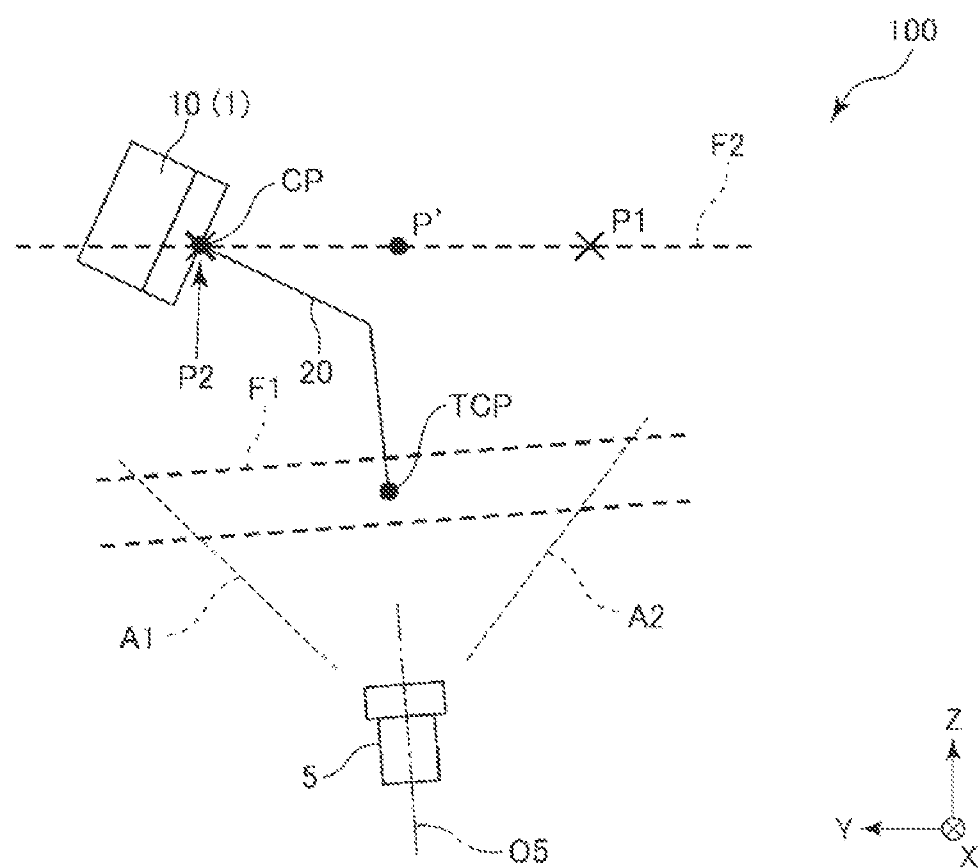
FIG. 13 is a schematic diagram showing a state in which the robot system shown in FIG. 1 executes the calibration method according to the present disclosure.

Then, at step S111, as shown in FIG. 13, a position when the movement at step S110 is completed, i.e., a position P2 of the control point CP in the second state is taught. The second step includes the above described steps S105 to S111.

As described above, at the second step, when the second state is caused from the first state, the robot arm 10 is driven to maintain the control point CP as the second control point in the position in the first state and rotate the robot arm 10 around the first axis O1 along the vertical direction, the robot arm 10 is driven to locate the tool center point TCP as the first feature point at the imaging center as the predetermined position in the captured image of the imaging unit 5, the robot arm 10 is driven to rotate the tool center point TCP about the second axis O2 parallel to the normal of the reference surface F2, the robot arm 10 is driven to locate the tool center point TCP at the imaging center as the predetermined position in the captured image of the imaging unit 5, and thereby, the robot arm 10 is turned into the second state. Through the step, a first reference position P0A, which will be described later, may be accurately obtained.

12. Step S112 (Third Step)

Figure 14:
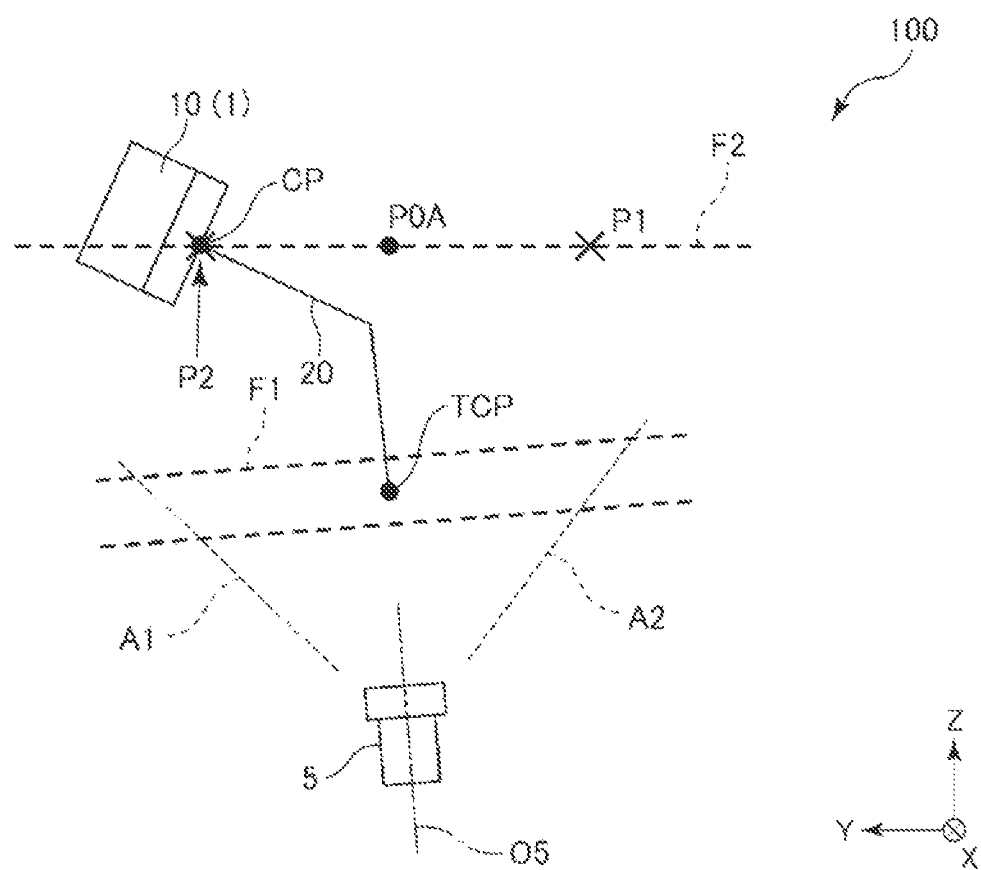
FIG. 14 is a schematic diagram showing a state in which the robot system shown in FIG. 1 executes the calibration method according to the present disclosure.

Then, at step S112, as shown in FIG. 14, the first reference position P0A is obtained from the position P1 of the control point CP in the first state and the position P2 of the control point CP in the second state. The first reference position P0A refers to a position as a reference for obtainment of a first vector B1, which will be described later. At this step, a midpoint between the position P1 and the position P2 is set as the first reference position P0A and coordinates thereof are stored in the memory unit 32.

13. Step S113 (Third Step)

Figure 15:
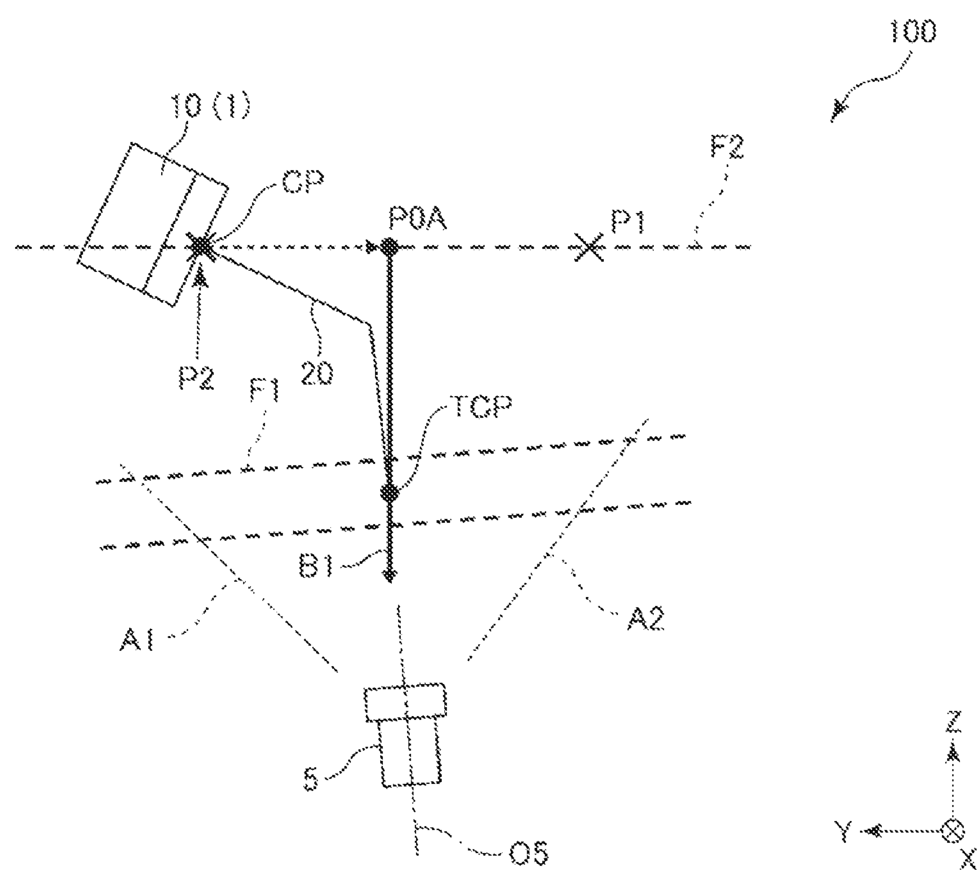
FIG. 15 is a schematic diagram showing a state in which the robot system shown in FIG. 1 executes the calibration method according to the present disclosure.

Then, at step S113, as shown in FIG. 15, the first vector B1 which is a first position relationship is obtained. The first vector B1 is a straight line of a component starting from the first reference position P0A toward the position of the tool center point TCP in the second state. Then, the first vector B1 is stored in the memory unit 32.

The third step includes these step S112 and step S113 of calculating the first vector B1 as the first position relationship between the first reference position P0A obtained from the position P1 of the control point CP in the first state and the position P2 of the control point CP in the second state and the position of the tool center point TCP in the second state.

14. Step S114

Then, at step S114, whether or not the round is the first round of the loop is determined. At step S114, when the first round of the loop is determined, the process moves to step S115. Note that, at step S114, when, not the first round, but the second round of the loop is determined, the process moves to step S116.

Figure 16:
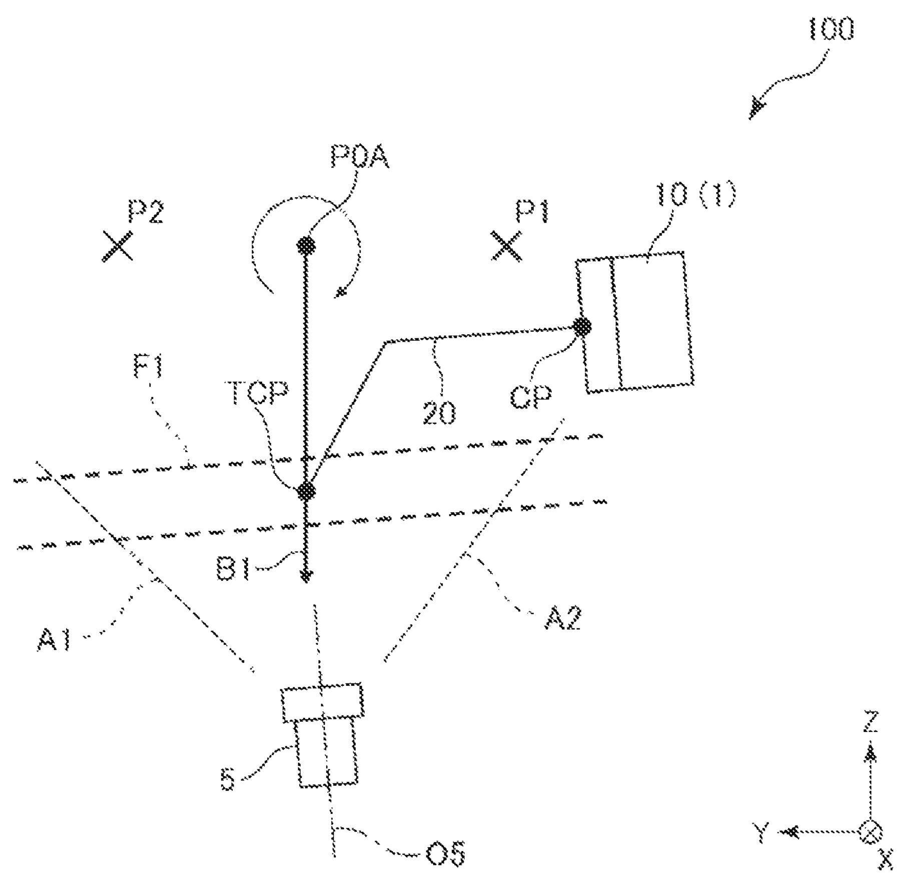
FIG. 16 is a schematic diagram showing a state in which the robot system shown in FIG. 1 executes the calibration method according to the present disclosure.

At step S115, as shown in FIG. 16, the robot arm 10 in the second state is moved. At this step, the robot arm 10 is driven to rotate by a predetermined angle around an axis passing through the first reference position P0A and parallel to the X-axis. An amount of rotation at step S115 is e.g. from 30° to 180° as long as the positions of the tool center point TCP and the control point CP after the movement may be different from the initial positions at step S101. Further, the rotation center at step S115 may be e.g. an axis passing through the first reference position P0A and parallel to the Y-axis as long as the positions of the tool center point TCP and the control point CP after the movement may be different from the initial positions at step S101.

15. Second Round of Loop

Then, returning to step S103, the second round of the loop is executed, that is, step S103 to step S113 are executed in a state in which the positions of the tool center point TCP and the control point CP are different from the initial positions at step S101. Thereby, the fourth step to the sixth step are executed.

Figure 17:
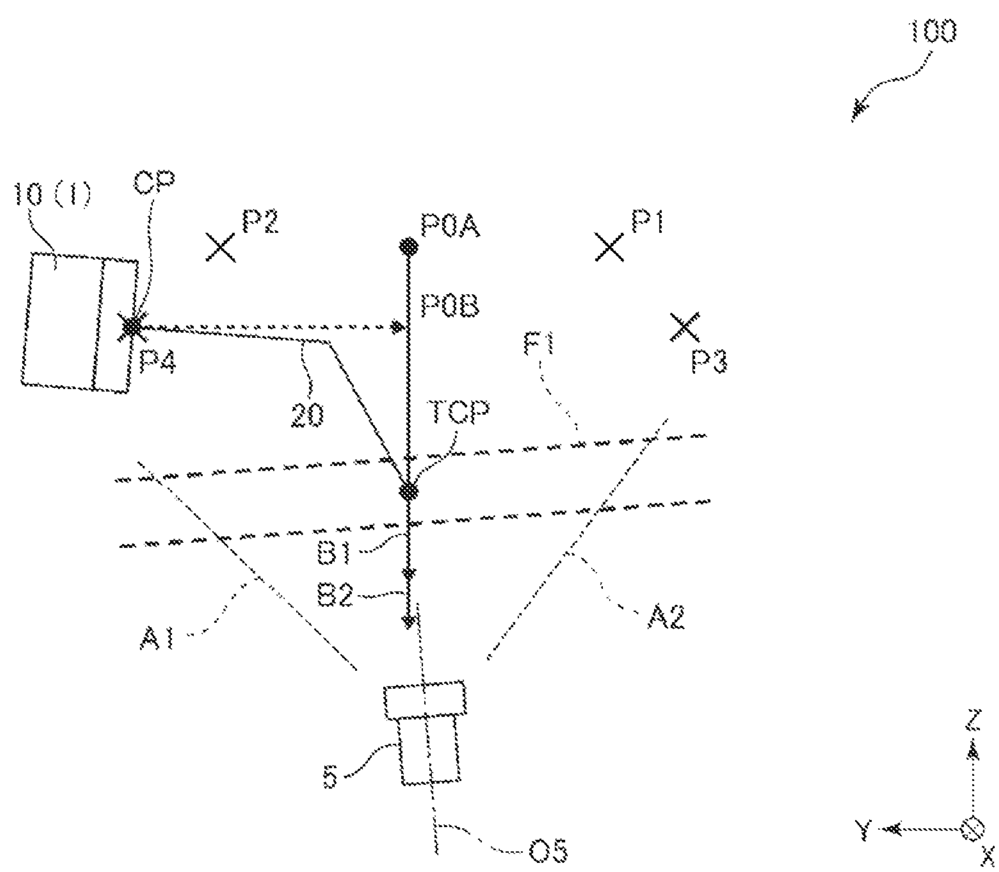
FIG. 17 is a schematic diagram showing a state in which the robot system shown in FIG. 1 executes the calibration method according to the present disclosure.

The fourth step includes step S103 and step S104 of the second round of the loop. The fourth step is a step of imaging the robot 1 using the imaging unit 5 and moving the robot arm 10 to cause a third state in which the tool center point TCP is located at the imaging center in the captured image of the imaging unit 5 and the robot arm 10 takes a third posture different from the first posture. Through the fourth step, as shown in FIG. 17, teaching of a position P3 as a position of the control point CP in the third state is completed.

The fifth step includes step S105 to step S111 of the second round of the loop. The fifth step images the robot 1 and moves the robot arm 10 to cause a fourth state in which the tool center point TCP is located at the imaging center in the captured image of the imaging unit 5 and the robot arm 10 takes a fourth posture different from the second posture. Thereby, as shown in FIG. 17, teaching of a position P4 as a position of the control point CP in the fourth state is completed. That is, in the embodiment, the first posture, the second posture, the third posture, and the fourth posture are different from one another.

As described above, at the fifth step, when the fourth state is caused from the third state, the robot arm 10 is driven to maintain the control point CP as the second control point in the position in the third state and rotate the robot arm 10 around the normal of the reference surface F2, the robot arm 10 is driven to locate the tool center point TCP as the first feature point at the imaging center as the predetermined position in the captured image of the imaging unit 5, the robot arm 10 is driven to rotate the tool center point TCP around the axis parallel to the normal of the reference surface F2, the robot arm 10 is driven to locate the tool center point TCP at the imaging center as the predetermined position in the captured image of the imaging unit 5, and thereby, the robot arm 10 is turned into the fourth state. Through the step, a second reference position POB, which will be described later, may be accurately obtained.

The sixth step includes step S112 and step S113 of the second round of the loop. That is, as shown in FIG. 17, the sixth step is a step of obtaining the second reference position POB obtained from the position P3 of the control point CP in the third state and the position P4 of the control point CP in the fourth state, calculating a second vector B2 as a second position relationship between the second reference position POB and the tool center point TCP in the fourth state, and storing the second vector B2 in the memory unit 32. The second vector B2 is a straight line of a component starting from the second reference position POB toward the position of the tool center point TCP in the fourth state.

16. Step S116 (Seventh Step)

Figure 18:
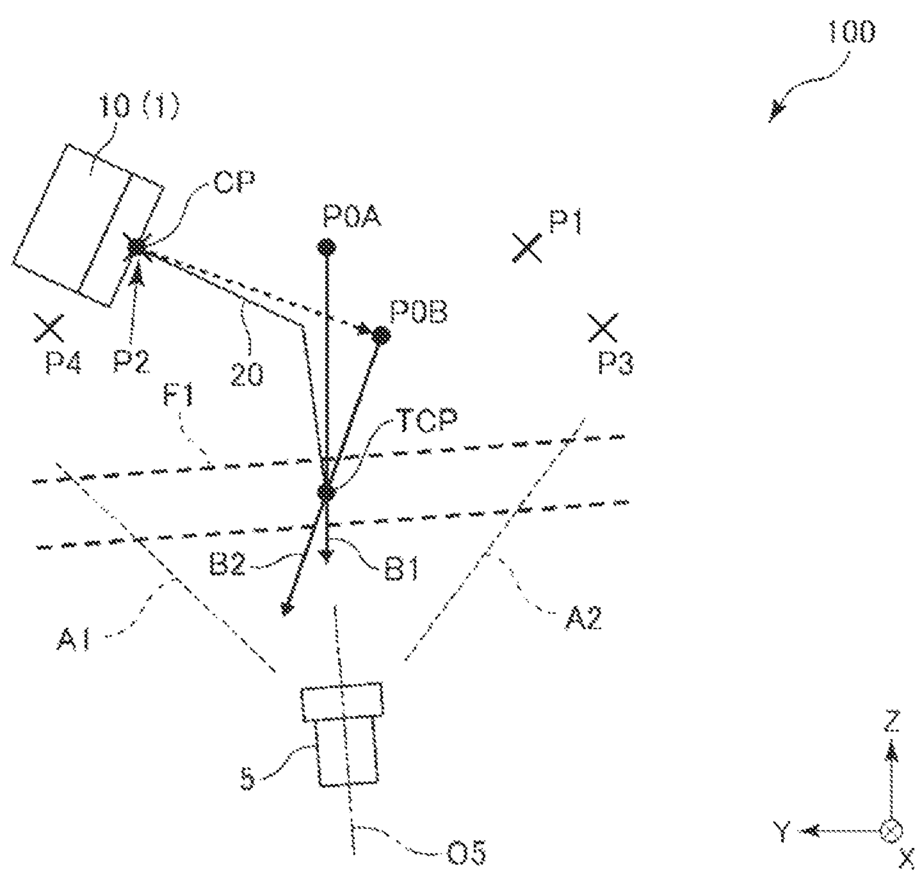
FIG. 18 is a schematic diagram showing a state in which the robot system shown in FIG. 1 executes the calibration method according to the present disclosure.

Then, at step S116, as shown in FIG. 18, coordinates of the tool center point TCP in the robot coordinate system are calculated based on the first vector B1 and the second vector B2. Specifically, assuming that the robot arm 10 is moved to move the control point CP from the position P4 to the position P2, the second vector B2 is virtually displaced with the movement. Then, as shown in FIG. 19, an intersection P5 between the first vector B1 and the displaced second vector B2 is calculated, coordinates (X,Y,Z) of the intersection P5 are obtained, and the coordinates (X,Y,Z) are regarded as the position of the tool center point TCP when the control point CP is located in the position P2.

Note that, in the above description, the configuration to displace the second vector B2 is explained, however, the present disclosure is not limited to that. The first vector B1 may be displaced or both the first vector B1 and the second vector B2 may be displaced in different directions from each other.

As described above, the first position relationship is the first vector B1 from the first reference position P0A toward the position P2 of the control point CP as the second control point in the second state, and the second position relationship is the second vector B2 from the second reference position POB toward the position P4 of the control point CP in the fourth state. Further, at the seventh step, one of the first vector B1 and the second vector B2 is displaced and the coordinates of the intersection P5 of the first vector B1 and the second vector B2 are regarded as coordinates of the tool center point TCP in the robot coordinate system. Thereby, the coordinates of the control point CP and the coordinates of the tool center point TCP may be obtained and the position relationship between the control point CP and the tool center point TCP may be accurately known.

Note that, in the embodiment, the configuration to displace the second vector B2 is explained, however, the present disclosure is not limited to that. For example, the first vector B1 may be displaced.

The position of the control point CP and the position of the tool center point TCP may be connected, that is, associated based on the position relationship between the control point CP and the tool center point TCP. Therefore, the robot arm 10 may be driven with reference to the position of the tool center point TCP and predetermined work may be accurately performed.

As described above, the present disclosure is the calibration method, in the robot 1 having the robot arm 10, of obtaining the position relationship between the tool center point TCP as the first control point set for the end effector 20 attached to the distal end of the robot arm 10 and the control point CP as the second control point set closer to the robot arm 10 side than the end effector 20. Further, the calibration method according to the present disclosure includes the first step of imaging the robot 1 using the imaging unit 5 and moving the robot arm 10 to cause the first state in which the first feature point of the robot 1 associated with the tool center point TCP is located in the predetermined position, i.e., at the imaging center in the captured image of the imaging unit 5 and the robot arm 10 takes the first posture, the second step of imaging the robot 1 and moving the robot arm 10 to cause the second state in which the tool center point TCP that may be regarded as the first feature point is located at the imaging center in the captured image of the imaging unit 5 and the robot arm 10 takes the second posture, the third step of calculating the first vector B1 as the first position relationship between the first reference position P0A obtained from the position P1 of the control point CP in the first state and the position P2 of the control point CP in the second state and the position of the tool center point TCP in the second state, the fourth step of imaging the robot 1 using the imaging unit 5 and moving the robot arm 10 to cause the third state in which the tool center point TCP is located at the imaging center in the captured image of the imaging unit 5 and the robot arm 10 takes the third posture, the fifth step of imaging the robot 1 and moving the robot arm 10 to cause the fourth state in which the tool center point TCP is located at the imaging center in the captured image of the imaging unit 5 and the robot arm 10 takes the fourth posture, the sixth step of calculating the second vector B2 as the second position relationship between the second reference position POB obtained from the position P3 of the control point CP in the third state and the position P4 of the control point CP in the fourth state and the tool center point TCP in the fourth state, and the seventh step of calculating the coordinates of the tool center point TCP in the robot coordinate system based on the first vector B1 and the second vector B2.

According to the present disclosure, there is no process of visually checking the positions of the tool center point TCP etc. by the operator, and more accurate calibration may be performed. Further, a touch-up process performed in related art may be omitted and the time may be shortened. Furthermore, it is not necessary to prepare an imaging unit having an autofocus function or an imaging unit having a deeper depth of field, and calibration may be performed using a relatively inexpensive imaging unit.

Note that, in the above description, the predetermined position in the captured image of the imaging unit 5 is explained as the imaging center, however, the present disclosure is not limited to that. The predetermined position may be any position in the captured image.

In the above description, as an example in which the first feature point and the tool center point TCP are associated with each other, the case where the first feature point coincides with the tool center point TCP is explained, however, the present disclosure is not limited to that. The first feature point may be any other position than the tool center point TCP of the end effector 20. Or, the position relationship between the control point CP and the tool center point TCP may be obtained using a second feature point and a third feature point, which will be described as below.

Figure 21:
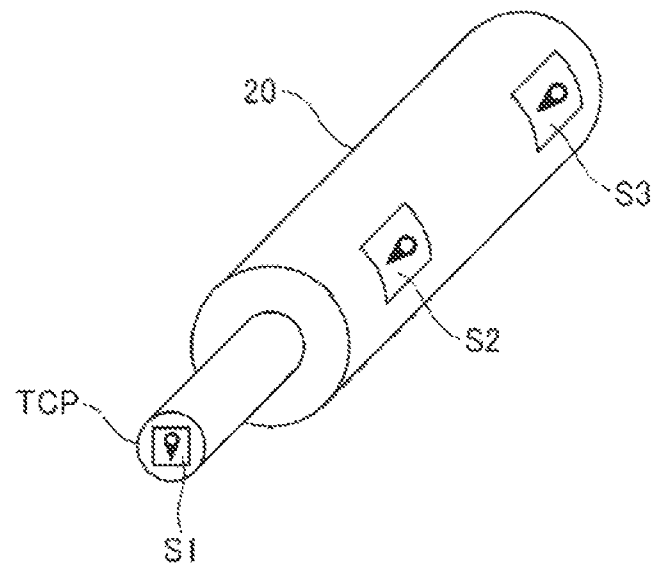
FIG. 21 is a perspective view showing an example of an end effector shown in FIG. 1.

For example, the end effector 20 shown in FIG. 21 has a marker S1 as a first feature point, a marker S2 as a second feature point, and a marker S3 as a third feature point. The marker S1 is the first feature point and provided in the distal end portion of the end effector 20, i.e., the position corresponding to the tool center point TCP. The marker S2 is the second feature point and provided in a center portion of the end effector 20 in the longitudinal direction. The marker S3 is the third feature point and provided in a proximal end portion of the end effector 20.

For example, the position of the tool center point TCP of the end effector 20 can be known using the marker S2 and the marker S3. For example, the above described step S101 to step S116 are performed using the marker S2 as the feature point and, then, the above described step S101 to step S116 are performed using the marker S3 as the feature point. Thereby, coordinates of the marker S1 may be obtained based on the position relationship between the marker S2 and the control point CP and the position relationship between the marker S3 and the control point CP.

Further, a position relationship between the marker S2 and the marker S3 is obtained, that is, a vector from an arbitrary point on the marker S3 toward an arbitrary point on the marker S2 is obtained and the vector is applied to the marker S1, i.e., the tool center point TCP, and thereby, the posture of the end effector 20 may be obtained.

Figure 22:
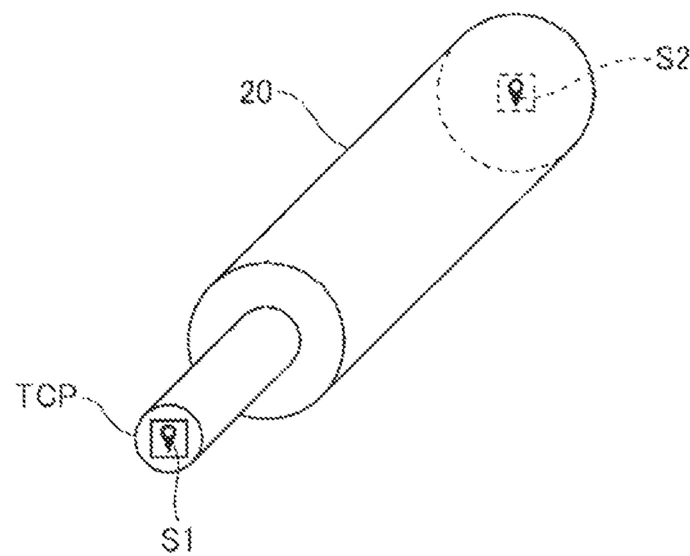
FIG. 22 is a perspective view showing an example of the end effector shown in FIG. 1.
Figure 23:
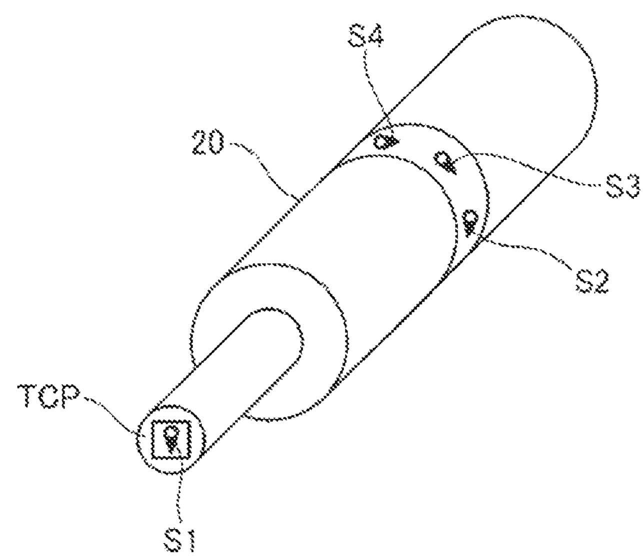
FIG. 23 is a perspective view showing an example of the end effector shown in FIG. 1.
Figure 24:
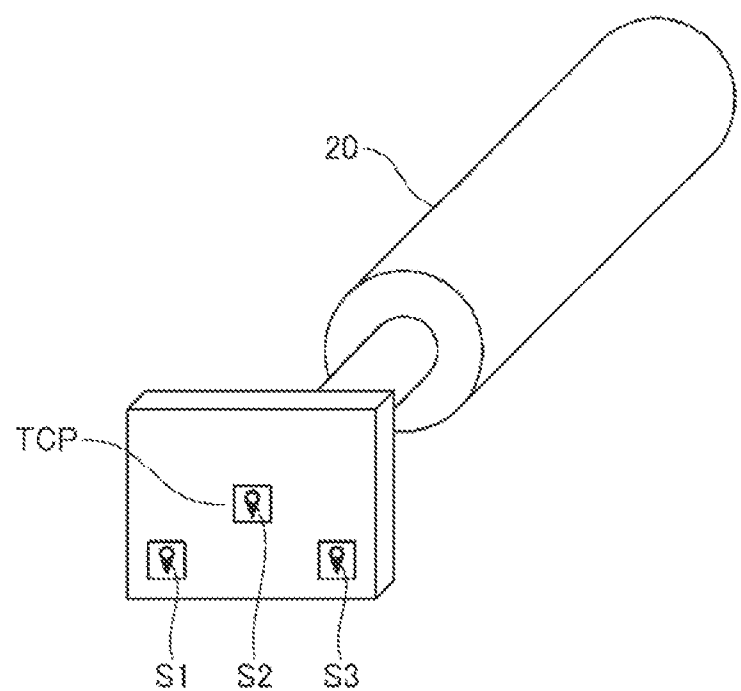
FIG. 24 is a perspective view showing an example of the end effector shown in FIG. 1.

Or, for example, calibration may be easily and accurately performed by the calibration method according to the present disclosure using the end effectors 20 as shown in FIGS. 22 to 24.

The end effector 20 shown in FIG. 22 has a marker S1 and a marker S2. The marker S1 is the first feature point and provided in the distal end portion of the end effector 20, i.e., the position corresponding to the tool center point TCP. The marker S2 is the second feature point and provided in a proximal end of the end effector 20. The calibration may be easily and accurately performed by the calibration method according to the present disclosure using the end effector 20.

The end effector 20 shown in FIG. 23 has a marker S1, a marker S2, a marker S3, and a marker S4. The marker S1 is the first feature point and provided in the distal end portion of the end effector 20, i.e., the position corresponding to the tool center point TCP. The marker S2 is the second feature point and provided in a portion in the middle of the end effector 20 in the longitudinal direction. The marker S3 is the third feature point and provided in a portion in the middle of the end effector 20 in the longitudinal direction. The marker S4 is a fourth feature point and provided in a portion in the middle of the end effector 20 in the longitudinal direction. Further, the marker S2 to marker S4 are arranged in a circumferential direction of the end effector 20. The calibration may be easily and accurately performed by the calibration method according to the present disclosure using the end effector 20.

The end effector 20 shown in FIG. 24 has a marker S1 as the first feature point, a marker S2 as the second feature point, and a marker S3 as the third feature point. The marker S1 to marker S3 are provided in the distal end portion of the end effector 20. Specifically, the marker S1 to marker S3 are placed on the distal end surface of the end effector 20 in different positions from one another. The calibration may be easily and accurately performed by the calibration method according to the present disclosure using the end effector 20.

As above, the calibration method according to the present disclosure is explained with respect to the illustrated preferred embodiments, however, the present disclosure is not limited to those. The respective steps of the calibration method may be replaced by arbitrary steps that may exert the same functions. Or, an arbitrary step may be added thereto.

What is claimed is:

1. A calibration method for causing a processor to execute a process, the calibration method comprising executing on the processor the steps of:

a first step including:

moving a robot arm having an end effector of a robot to a first location in which the robot arm with the end effector takes a first posture, the end effector being attached to a distal end of the robot arm, the end effector having a first control point, the robot arm having a second control point, the first control point being located at a predetermined position in an imaging area that is captured by and image sensor at the first location, the second control point being located on a reference plane extending along an X axis and a Y axis perpendicular to each other at the first location, the end effector extending along a direction that is shifted from a Z axis perpendicular to the X axis and the Y axis at the first location;

imaging the robot arm with the end effector to generate a first image when the robot arm with the end effector takes the first posture at the first location;

setting a position of the second control point as a first posture position when the robot arm with the end effector takes the first posture at the first location; and teaching a first coordinate of the first posture position to the robot;

a second step including:

moving the robot arm with the end effector to a second location from the first location while the second control point moves on the reference plane, the robot arm with the end effector taking a second posture at the second location, the first control point being located at the predetermined position in the imaging area at the second location;

imaging the robot arm with the end effector by the image sensor to generate a second image when the robot arm with the end effector takes the second posture at the second location;

setting a position of the second control point as a second posture position when the robot arm with the end effector takes the second posture at the second location; and teaching a second coordinate of the second posture position to the robot;

a third step including:

calculating a first reference position based on the first posture position having the first coordinate and the second posture position having the second coordinate; and calculating a first vector, the first vector extending from the first reference position toward the first control point when the robot arm with the end effector takes the second posture at the second location;

a fourth step including:

rotating the robot arm with the end effector around a first axis at a first predetermined angle to place the robot arm with the end effector to a third location from the second location, the first axis being parallel to the X axis, the robot arm with the end effector taking a third posture at the third location, the first control point being located at the predetermined position in the imaging area at the third location;

imaging the robot arm with the end effector by the image sensor to generate a third image when the robot arm with the end effector takes the third posture at the third location;

setting a position of the second control point as a third posture position when the robot arm with the end effector takes the third posture at the third location; and teaching a third coordinate of the third posture position to the robot;

a fifth step including:

rotating the robot arm with the end effector around a second axis at a second predetermined angle to place the robot arm with the end effector to a fourth location from the third location, the second axis being a normal line with respect to the reference plane and passing the first control point when the robot arm with the end effector takes the third posture at the third location, the robot arm with the end effector taking a fourth posture at the fourth location, the first control point being located at the predetermined position in the imaging area at the fourth location;

imaging the robot arm with the end effector by the image sensor to generate a fourth image when the robot arm with the end effector takes the fourth posture at the fourth location;

setting a position of the second control point as a fourth posture position when the robot arm with the end effector takes the fourth posture at the fourth location; and teaching a fourth coordinate of the fourth posture position to the robot;

a sixth step including:

calculating a second reference position based on the third posture position having the third coordinate and the fourth posture position having the fourth coordinate; and calculating a second vector, the second vector extending from the second reference position toward the first control point when the robot arm with the end effector takes the fourth posture at the fourth location; and a seventh step of calculating coordinates of a first feature point associated with the first control point in a robot coordinate system with respect to the first, second, third, and fourth postures based on the first vector and the second vector.

2. The calibration method according to claim 1, wherein in the second step, the robot arm with the end effector rotates around a normal line with respect to the reference plane so as to move the robot with the end effector from the first location to the second location.

3. The calibration method according to claim 1, wherein in the seventh step, the first vector or the second vector is displaced, and coordinates of an intersection between the first vector and the second vector are regarded as the coordinates of the first feature point in the robot coordinate system.

* * * * *